US007929487B2

(12) United States Patent
Van Wijngaarden et al.

(10) Patent No.: US 7,929,487 B2
(45) Date of Patent: Apr. 19, 2011

(54) METHOD AND APPARATUS FOR CELLULAR COMMUNICATION OVER DATA NETWORKS

(75) Inventors: Adriaan Jeroen De Lind Van Wijngaarden, New Providence, NJ (US); Peretz Moshe Feder, Englewood, NJ (US); Jungsang Kim, Chapel Hill, NC (US); Zhengxiang Ma, Summit, NJ (US); Anatoli Olkhovets, Fort Lee, NJ (US); Arnold Brian Siegel, Somerset, NJ (US); Theodore Sizer, II, Little Silver, NJ (US); Michael George Zierdt, Hillsborough, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1231 days.

(21) Appl. No.: 11/435,665

(22) Filed: May 17, 2006

(65) Prior Publication Data

US 2006/0209752 A1  Sep. 21, 2006

Related U.S. Application Data

(63) Continuation-in-part of application No. 10/884,203, filed on Jun. 30, 2004.

(60) Provisional application No. 60/536,871, filed on Jan. 16, 2004.

(51) Int. Cl.
*H04W 4/00* (2009.01)

(52) U.S. Cl. .......................... 370/328; 370/331; 455/436
(58) Field of Classification Search .................. None
See application file for complete search history.

(56) References Cited

U.S. PATENT DOCUMENTS

| 6,424,834 B1 * | 7/2002 | Chang et al. .................. 455/436 |
| 2004/0151139 A1 * | 8/2004 | Li et al. ......................... 370/331 |

* cited by examiner

*Primary Examiner* — Erika A Gary
(74) *Attorney, Agent, or Firm* — John Ligon (57) ABSTRACT

Cellular signals or other wireless signals/messages are introduced into a building or to an outside location by transmitting packets corresponding to those signals over a data network and low cost cables to designated locations within the data network. Once the designated packets containing the signals reach the destination, they are then broadcast over the air to a terminal capable of receiving the wireless message. In a first embodiment, an in-building gigabit Ethernet network, such as that currently existing presently in many buildings, is used to distribute radio signals indoors. Instead of transmitting the radio signals over the air from a repeater connected to a base station, coded baseband signals generated by the coding processor (e.g., a CDMA Modem Unit) in the base station are packetized and sent over the Ethernet network to radio processing equipment and antennas distributed throughout the building. The radio processing equipment strips the packet headers from the baseband signal packets so those signals can be broadcast via the antennas to one or more mobile terminals. Additionally, hard handoff is employable upon entering a building using specifically configured pilot signals.

9 Claims, 5 Drawing Sheets

METHOD AND APPARATUS FOR CELLULAR COMMUNICATION OVER DATA NETWORKS

CROSS REFERENCE TO RELATED APPLICATIONS

This application is a Continuation in Part of U.S. patent Ser. No. 10/884,203 filed Jun. 30, 2004, which in turn claimed priority to U.S. Provisional Patent Application Ser. No. 60/536,871 filed Jan. 16, 2004, both of which are hereby incorporated by reference. This application is related to U.S. patent application Ser. No. 11/435,664 filed May 17, 2006 (concurrently herewith) which is hereby incorporated by reference in its entirety.

FIELD OF THE INVENTION

The present invention is related generally to wireless communications in buildings.

BACKGROUND OF THE INVENTION

Wireless communications systems are becoming an increasingly integral aspect of modern communications. In fact, recent trends show that an increasing number of users are replacing all wire-line methods of communications with their wireless counterparts such as, for example, cellular telephones in place of traditional wire-line telephones. Since such cellular telephones are essentially radios, it is well known that signal quality between a cellular base station and a handset degrades under certain circumstances. The most significant source of degradation occurs when a user moves from an outside location to an indoor location where the radio signals are required to pass through or around various obstructions. Since many users place the majority of cellular calls from within buildings or other structures, achieving high quality consistent indoor coverage is becoming more essential.

Several methods for achieving indoor cellular network coverage are known. For example, one method of achieving such coverage, known as a distributed antenna system (DAS), is illustratively shown in FIG. 1. A DAS uses a base station and a repeater or a power amplifier that is typically located within a building to retransmit within the building a signal received at an external antenna. Referring to the illustrative DAS of FIG. 1, when a signal 103 is transmitted from an antenna in a cellular communications network, such as antenna 101 (e.g., an antenna in a cellular communications network), antenna 113, which is external to building 111, receives signal 103. Signal 103 is then passed along connection 104 which is, illustratively, a coaxial cable, to component 105 which is, in this example, a radio repeater. Repeater 105 forwards the signal to amplifiers 106a, 107a, 108a and 109a. These amplifiers amplify the signal which is then transmitted over in-building antennas 106, 107, 108 and 109. Thus, the result is that cellular telephone 102 receives the signal transmitted from antenna 113 via antenna 109. By passing the signal along a wired connection from antenna to repeater 105 and rebroadcasting the signal over antennas 106-109, the problems associated with poor signal quality in buildings are alleviated.

While DAS systems are advantageous in many aspects, they are limited in certain regards. For example, in order to install a DAS, cabling (such as coaxial cabling) must be installed throughout the building at each location where an in-building antenna is desired. Thus, installation expense is relatively high. Additionally, such systems are not flexibly expandable and there is typically no mechanism for reprovisioning or reallocating the bandwidth available to different locations within the building.

Another method for achieving indoor cellular network coverage relies on the use of small in-building base transceiver stations (BTSs), which are smaller versions of well-known base stations such as are used in a traditional cellular network, to provide essentially an entire in-building cellular network. The result of using such small BTSs is a network of so-called pico-cells (cells with a short range) that operate similarly to a low-powered traditional cellular network in provisioning bandwidth and managing data and voice calls within one or more individual buildings. However, since such a system is essentially a miniaturized cellular network, management of a multitude of such BTSs within a building would be problematic as it would require network components (such as a Radio Network Controller (RNC) and/or a Mobile Switching Center (MSC) in a CDMA network) to provision bandwidth and manage calls across the large number of pico-cells. Hence, a mini-BTS system is relatively cost-prohibitive and complex to install and maintain.

As cellular usage increases there is a need to provide increased and cost effective capacity and coverage outdoors in dense urban areas, outdoor malls, or in business or academic campuses. Many of the same techniques that are used indoors can also be used in these environments. Typically a base station remotely serves a given outdoor location using DAS systems in an architecture known as "hoteling". However, these architectures require the use of proprietary RF or fiber links to connect the base stations and the remote antennas.

SUMMARY OF THE INVENTION

The aforementioned problems related to 1) in-building wireless communications including 2) problems associated with hand off between base stations operating respectively inside and outside a building, are essentially solved by the present invention. As to the later problem, it has been recognized that such handoff is not conducive to traditional approaches. For any transition between one base station to a second, soft handoff is usually performed as the transition mechanism. In such soft handoff procedure a user receiving from a base station at a specified frequency approaches a second base station transmitting at the same frequency. Each base station employs a given PN sequence (pseudo-random noise sequence) of length $2^{15}$ to spread the bandwidth of the modulated signal to the larger transmission bandwidth. For example, in a CDMA2000 system, the user differentiates the second base station from the first because the two have different PN offsets. These offsets are timing delays relative to the beginning of a 2 second timing cycle. The beginning of such 2 second timing cycle is derived from a GPS (global positioning satellite) signal. The 2 second cycle is divided into 75 twenty-six and two-thirds milliseconds intervals of $2^{15}$ chips each with each chip being a timing interval of about 0.813 microseconds. An interval of $2^{15}$ chips is divided, in turn, into 512 valid PN offsets that are separated by 64 chips each. Each base station within a transmission region is assigned a different PN offset. By determining the specific time at which a base station starts its transmission of the PN code a user is able to differentiate one base station from another.

When a user communicating with a first base station approaches a second base station recognized as having a different PN offset but with the same frequency, the user establishes contact with the second base station while maintaining contact with the first. As the signal of the first base station becomes weaker than an acceptable threshold, transmission from this first station is terminated and communication is continued through interaction with the second base station. This procedure of approaching a second base station, communicating with the first and the second while subsequently dropping the first is denominated soft handoff.

The use of different PN offsets for base stations at the same frequency however presents previously unrecognized problems in the context of a transition from a base station outside a building to a base station within a building. In particular, if the base station within a building merely transmits from all its internal antennae at the same frequency as the outside base station but with a different PN offset, such transmission is likely to be recognized by users external to the building. Such outside users quite possibly could recognize this transmission from the building as a cell for which handoff should be performed. However, such handoff, if the user does not enter the building, could produce a service interruption. Thus it is desirable for transmission from the internal base stations to be performed at a frequency different from that of the external base stations to avoid such difficulties.

The use of this second frequency, although solving inadvertent handoff problems, produces a new set of difficulties. As a user enters a building in which the internal base station is broadcasting at a frequency different from the external base station, the user will not attempt a soft transition. The user instead would be unaware of what would be considered an adventitious frequency. Thus handoff to the internal base station is not accomplished and a service disruption generally ensues.

This additional difficulty is overcome by employing a non-primary channel, e.g. a pilot channel, of an internal base station. A non-primary channel is one that is not used to transmit the primary information carried by the system. For example, a pilot channel is present in most systems and does not carry data or voice traffic (primary information) but instead is a channel carrying only a PN sequence and is conventionally employed by a user to lock on the system as well as identify the base station. (For convenience in the context of this invention all non-primary channels are comprehended by the term pilot channel.) In the inventive approach such non-primary channel allows transmission at the frequency of the external base station while maintaining broadcasting on the principal communication channel at a second frequency. However, the PN offset of the internal base station is used on the non-primary channel. Thus a user entering the building detects the non-primary, e.g. pilot, transmission and undertakes handoff. However, the handoff in the inventive approach is not a soft handoff. As discussed, such non-primary channel transmission is at the same frequency as the external cell but at a different PN offset. When the user recognizes such an offset associated with an in-building base station immediate handoff is affected—the user need not remain in communication with both the external and internal base station. Thus soft handoff is unnecessary. Once hard handoff begins the network signals the user to transition to the main frequency of the internal base station completing the transition. To avoid unnecessary interference, the intensity of the pilot channel is limited.

In an analogous manner previously unrecognized problems occur when a user exits the building. The user is communicating at the internal frequency and does not recognize the different frequency of the external base station. This further difficulty is overcome by employing a relatively low signal strength transmitter at the building exit. Such transmitter employs a frequency the same as the main communications frequency of the internal base station but uses the PN offset of the external base station. Thus detection of this relatively low signal strength transmission initiates hard handoff. Then the network, in an analogous manner to the process of transitioning into the building, instructs the user to employ the external frequency of the external base station.

It has also been found that in the transitions into and out of a building in accordance with the invention the PN offsets of the internal base station are correctly timed by an advantageous measurement involving the transit time of packets from the BSI to each RRH.

In accordance with further principles of the present invention, cellular signals or other wireless signals/messages are introduced into a building by transmitting packetized messages corresponding to those messages over a shared or dedicated data network to designated locations within the building. Once the designated destination is reached, the packet headers are stripped from the packets and the wireless message is then broadcast over the air to an intended recipient.

In one embodiment, base station interface cards (BSIs) are used in place of RF generating equipment in a base station such as that used in a cellular communications network (e.g., a CDMA network). For downlink signals, when a BSI receives coded baseband signals from a processor, such as a CDMA Modem Unit (CMU) in a CDMA system, the BSI then buffers the baseband signals and periodically creates data packets each containing a plurality of coded baseband signals. The BSI then forwards the data packets over a high-speed data network, such as a Gigabit Ethernet network, to one or more illustrative Gigabit switches. These switches duplicate and route the packets to one or more specific ports corresponding to a cellular CDMA sector which in turn corresponds to one or more radio transceivers, at least one of which corresponds to the address of the intended recipient of the message. In one embodiment, the radio transceivers contain equipment that extract the baseband signals from the packets, process the baseband signals, convert to RF format, amplify the signals, and broadcast the signals to an intended recipient over associated antennas.

For uplink signals, the radio transceivers receive uplink signals from a mobile user, the transceivers convert these to a digital format and generate packets of the coded signals and forward them through the network to the aforementioned switches and then to the BSI and CMU for transmission through the traditional wireless network to an intended recipient. In another embodiment, in order to increase the possible number of available radio transceivers, one or more special summing nodes combine the base band data in incoming uplink packets in order to reduce the number of packet streams passing through the BSI to the CMU. Since the signals are coded (e.g., with Walsh codes), the CMU can differentiate between the signals in the summed data packets and forward those signals to an intended destination in the wireless network. These summing nodes can be separate units, integrated with switches, or their functionality can be integrated into one or more of the radio transceivers.

DETAILED DESCRIPTION OF THE INVENTION

For pedagogic purposes the invention will first be described as to the aspects involving handoff initiated when entering or exiting a building and second as to a particularly advantageous configuration for the internal wireless system. The handoff aspects are implementable by modification from traditional internal systems or in a particularly advantageous embodiment with the inventive internal wireless system configuration.

Figure 4:
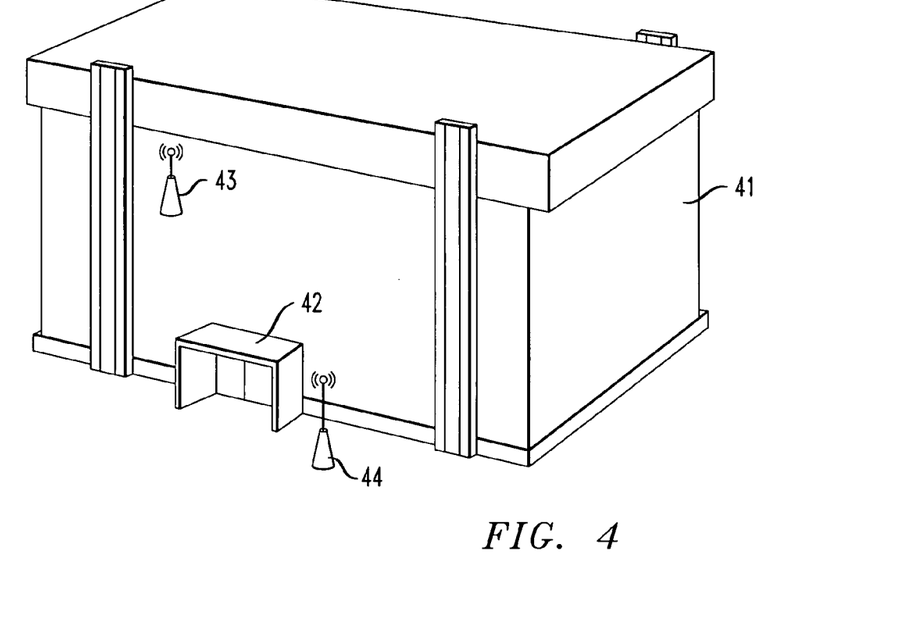
FIG. 4 is illustrative of configuration involved in the invention.

As to the handoff aspects a non-primary, e.g. pilot, channel of an internal transmitter is employed. As shown in FIG. 4, an antenna 43 radiating on this non-primary channel is positioned within a building in proximity to, generally within 100 feet of, an entrance 42 for building 41. The signal strength of the non-primary channel from antenna 43 is limited to avoid unacceptable interference with users external to the building. Unacceptable interference occurs when the strength of the non-primary channel from antenna, 43, measured by a mobile passing by the building exceeds the strength of the pilot from the closest external base station. The antenna 43 propagates non-primary channel signals at a frequency essentially equal to the principal frequency of the closest external base station. (Essentially equal in this context means that the difference in frequency is very small, e.g., within 50 parts per billion). The PN offset of this non-primary channel transmission is configured so that a user entering the building is able to differentiate such offset from the offset being employed by the external base station from which handoff is to be implemented.

Figure 5:
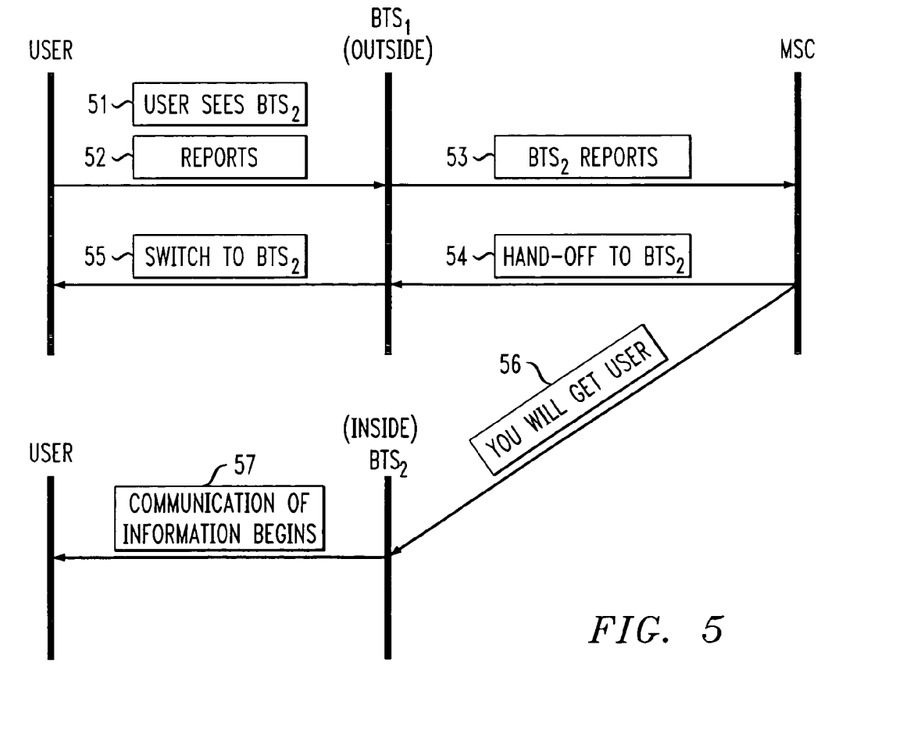
FIG. 5 illustrates communication related to operation of the invention.

Thus in step 51 shown in FIG. 5, as a user enters building 41 through entrance 42, the user detects the non-primary signal propagating from antenna 43 of an internal base station ($BTS_2$). Since the transmission frequency of the non-primary channel is essentially the same as that of the external base station ($BTS_1$) that is communicating with the user, and since the PN offset of the non-primary signal is distinguishable from that of the external base station, handoff is initiated. Importantly, because the confines of a building are relatively small, a weak non-primary signal strength is still easily detectable by the user while unacceptable interference from such limited intensity external to the building is not induced. The user reports in step 52 to $BTS_1$ that it has detected $BTS_2$.

As the handoff progresses the network recognizes that the user is under coverage of the internal base station through communication step 53 between this external base station $BTS_1$ and, for example, a MSC. In turn, the network through for example, the MSC, signals the user to hand off to $BTS_2$. This signal is accomplished, for example, by the MSC signaling $BTS_1$ that hand off should be performed and in step 55, this message is relayed by $BTS_1$ to the user. Thus the user is signaled to switch frequencies from the non-primary frequency (and thus the external base station frequency) to the principal frequency employed by the internal cell. To complete the hard handoff $BTS_2$ in step 56 is signaled by, for example, the MSC that the user is being handed off. That is the user, in step 57, after such conversion is communicating on the principal frequency of the internal base station recognizing the PN offset characteristic of both the non-primary channel and the principal channel of the internal cell.

An analogous handoff is employed when a user exits the building. An antenna 44 is positioned external to the building at an entrance such as entrance 42. Again the strength of the signal propagating from 44 is limited so that it is discernable by a user exiting the building but does not cause unacceptable interference with users not in close proximity to the exit. Typically signal strengths in the range −20 dBm to 10 dBm accomplish the goal of allowing communications to exiting users while avoiding interference with users a distance of 20 feet or more from the building entrance. Antenna 44 propagates a signal, for example, generated by a RRH, at a frequency essentially the same as the principal frequency of the internal base station but with the PN offset of the external base station. Thus since the user detects a signal at its operating frequency, but with a different PN offset, hard handoff is initiated by contacting $BTS_2$ and, in turn, the MSC. The MSC, in a manner analogous to that described above informs $BTS_1$ also of the handoff. By this conversion, handoff to the external base station is accomplished without unacceptable interference with other users.

Figure 2:
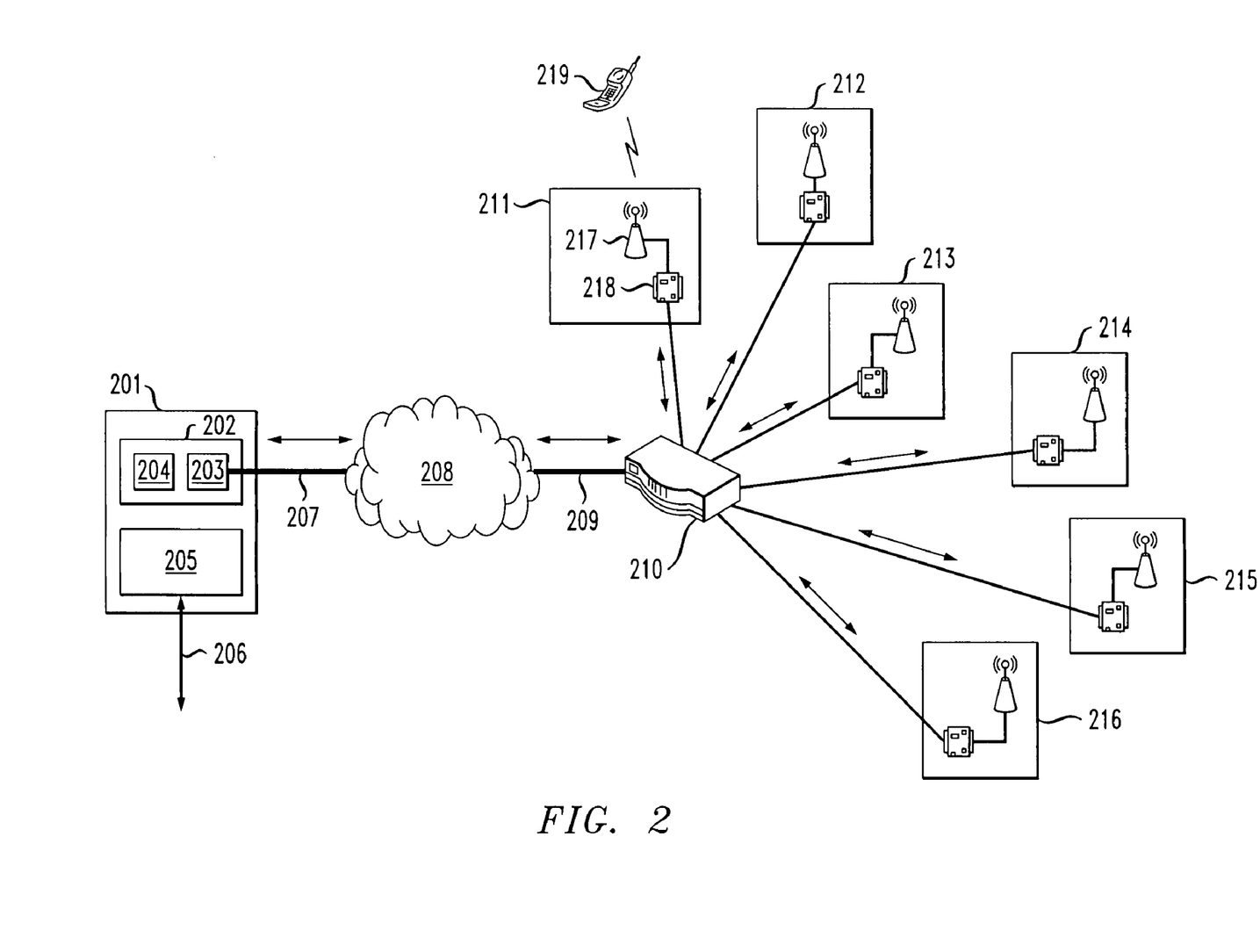
FIG. 2 shows an in-building cellular network in accordance with the principles of the present invention.

FIG. 2 shows an in-building communications network in accordance with the principles of one embodiment of the present invention. In the network of FIG. 2, base station 201 sends and receives messages from a wireless network via path 206. Base station 201 is, for example, similar to a base station used in a traditional CDMA network such as a OneBTS base station manufactured by Lucent Technologies, Murray Hill, N.J. One skilled in the art will recognize that such a base station traditionally has three main components: 1) a network interface for interfacing with the other components of the cellular network (e.g., a radio network controller (RNC)); 2) a digital baseband shelf typically having a processor (e.g., a CDMA modem unit (CMU)) for coding and decoding incoming and outgoing message traffic, as well as a radio (e.g., a Universal CDMA Radio (UCR)) for modulating/demodulating the coded digital message traffic onto/from a carrier signal; and 3) an RF shelf for amplifying the modulated signal and transmitting that signal over the air to a mobile user.

While the base station 201 of FIG. 2 in accordance with the principles of the present invention is similar to a traditional CDMA base station, there are some differences. Specifically, in accordance with the principles of the present invention, both the RF shelf and external base station antenna functions are not used in the in-building base station 201. This modified base station 201 may be physically located within a building to be serviced by the base station or, alternatively, external to that building. Additionally, the UCR of the digital baseband shelf 202 in base station 201 is replaced by a component herein referred to as a base station interface card (BSI) 203. The illustrative BSI 203 may be a component of similar form factor to the UCR and illustratively plugs into the same physical slot in the digital shelf traditionally occupied by the UCR. For downlink signals, as described more fully below, instead of receiving and transmitting coded cellular radio signals over the air, the BSI 203 in base station 201 functions to forward mobile user-coded baseband signals over a high-speed data network, such as illustrative gigabit Ethernet network 208 to a switch/summing node, also referred to herein as a Radio Distributor/Aggregator 210 (RDA), and subsequently to a desired end destination where the baseband signals are converted to RF and then broadcast over the air to a message recipient, such as mobile terminal 219. Similarly, as also discussed below, on the uplink, when a user, once again such as mobile terminal 219, transmits messages from, for example, a cellular telephone, those messages are transmitted via the illustrative RDA 210 and illustrative gigabit Ethernet network 208 to the BSI 203 and CMU 204 for further processing and distribution via the network interface equipment 205 and the wireless network via path 206. The below illustrative example specifically discusses one implementation of the present invention in a CDMA network. One skilled in the art, however, will recognize that the principles of the invention as herein described will be equally applicable to a GSM, UMTS or other wireless communications networks.

Figure 1:
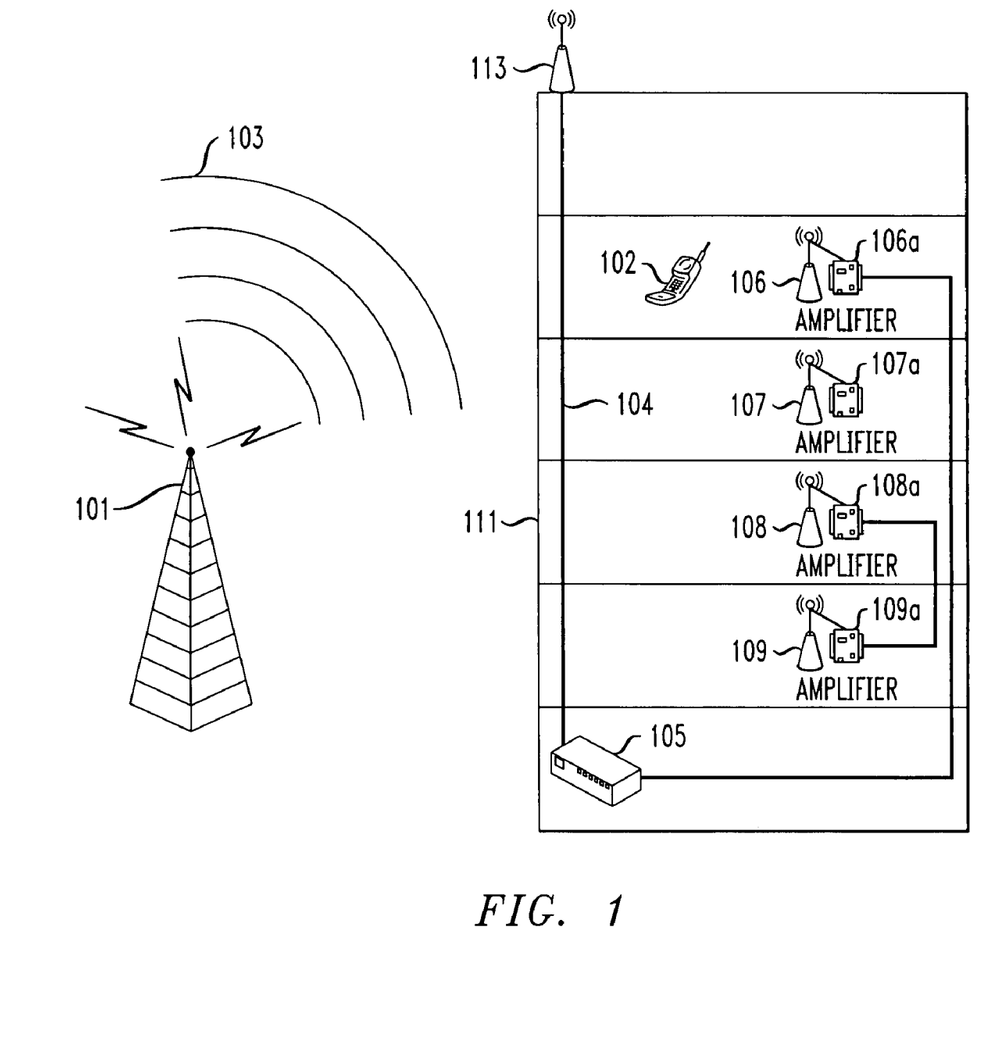
FIG. 1 shows a prior art distributed antenna system (DAS)

Specifically, on the downlink in a CDMA system, when a signal is addressed to a mobile terminal in a building, such as, referring to FIG. 1, mobile terminal 102 in building 111, the illustrative BSI 203, discussed above, receives digital I and Q baseband signals generated by the CMU 204 and stores them in a buffer. Illustratively, I and Q signals are received every 0.5 microseconds. Once the buffer reaches a predetermined level, or a predetermined amount of time has passed, the BSI 203 forms an Ethernet packet of those signals having a destination address (e.g., a MAC address) corresponding to a sector in which an intended recipient is present, such as a sector that is distinguished by the time offset of the pseudorandom number (PN) code of a pilot channel to which the mobile terminal 219 is tuned. One skilled in the art will recognize that other configurations and operations of the BSI are possible. For example, instead of connecting directly to the physical slot in the digital shelf, the BSI can be a separate component that connects to a digital, radio frequency (RF), or intermediate frequency (IF) port. In such a configuration, the BSI may receive digital coded baseband signals, as described above or, alternatively, may receive RF or IF signals and then convert those signals to digital form for buffering and packetizing.

The packets are then sent via gigabit Ethernet from the BSI to the RDA 210 over, illustratively, gigabit Ethernet. For downlink signals, the RDA acts essentially as a switch having, illustratively, a plurality of ports. Each port on the RDA illustratively corresponds to an addressable sector for the routing of messages. For example, each port of an RDA may be identified as a separate sector or, if a greater coverage area is desired, for example, then multiple ports may be designated as corresponding to a single sector. Each sector, in turn, corresponds to a one or more radio transceivers, referred to herein as remote radio heads (RRHs), such as RRHs 211, 212, 213, 214, 215 and 216 corresponding to an area of wireless coverage within a building. As one skilled in the art will recognize, RDAs can be connected as flexibly as regular data switches: multiple RDAs may be used in a cascaded fashion to facilitate greater control over the routing of messages to end recipients and to permit more granularity in the management of bandwidth allocation, or no RDA may be necessary for a point-to-point link between the BSI and a particular RRH. Alternatively, in some implementations, a single RRH on a single port of the RDA may suffice to serve a relatively large sector. One skilled in the art will recognize that the number of RRHs necessary to provide coverage to a sector will depend upon environmental factors such as, illustratively, the number of obstructions (e.g., walls or other such obstacles) in proximity to the RRH.

When the RDA 210 receives a message from the BSI 203 having a particular address (for example a Medium Access Control (MAC) address) corresponding to a particular sector, the RDA 210 compares that address to, for example, a look-up table to identify which ports on the RDA 210 correspond to the designated sector. This look-up procedure can use a variety of existing Ethernet protocols, such as using special multicast addresses, or having all RRHs belonging to a particular sector be a part of the same virtual LAN (VLAN), and broadcasting packets on that VLAN. Once the RDA 210 has identified the ports corresponding to the recipient sector(s), the RDA 210 will replicate the packet (if necessary to forward to multiple end destination RRHs) and forward a copy of the packet to the appropriate ports for further dissemination to the designated sectors and the corresponding RRHs 211-216.

Each RRH 211-216 has, illustratively, network interface equipment, timing and frequency synchronization equipment, signal processing elements, a power amplifier and one or more antennas. The network interface equipment of the destination RRH such as, in this case, RRH 211 corresponding to mobile user 219, receives the packets from the network and removes the headers from the packets. The I and Q baseband signals are then forwarded to the timing and synchronization equipment where the signals are buffered. As described more fully below, the signals are then processed, converted to RF format and played out to the power amplifier and broadcast over the air via the antenna(s) to a recipient end mobile user.

Since CDMA networks and Ethernet networks were designed for different uses (i.e., CDMA was designed for circuit switched voice applications and Ethernet was designed for packet switched data applications), manners of transmitting data across those networks differ relative to one another. One of the more critical differences is in how frequency and timing are managed in the different networks. Specifically, CDMA networks were designed with a tight timing/jitter tolerance of less than 2-3 microseconds using a synchronous frequency as required by the air-interface. Ethernet, on the other hand, was designed with a loose timing/jitter tolerance and an asynchronous frequency that is adequate for packet-switched data networking in, for example, a star network configuration. Overcoming these timing and frequency differences to achieve synchronization is critical to passing timely packets of CDMA data over an Ethernet network.

More specifically, timing synchronization is especially crucial for downlink traffic since the offsets in the pilot channels are used to identify the base station sectors in the network. On the uplink, however, while timing synchronization is important, one skilled in the art will recognize that it is sufficient to assure a certain, fixed delay among the uplink signals from the RRHs 211-216—precisely synchronizing the exact time is not necessary. In both uplink and downlink scenarios, timing synchronization may illustratively be achieved by first determining the minimum feasible time that a packet will spend transiting the data network between the BSI 203 and the RRH 210, hereinafter referred to as the minimum packet delay, $\tau_{min}$. This minimum packet delay is, for example, measured as a function of delays in buffering baseband signals in the BSI 203 to form the packets, transmission through the gigabit Ethernet MAC, the physical layer and the switches in the RDA 210, as well as the delay experienced traveling over cables. Thus, $\tau_{min}$ is a basic, illustrative reference time between the BSI 203 and the RRH 210 for a given Ethernet network topology.

This minimum reference time $\tau_{min}$, of course, is not the time typically experienced by a packet transiting the data network, only the feasible minimum based on known delays. The actual timing delays of packets through the data network are a function of, in part, queuing delays in the presence of other data traffic in the data network. This actual timing delay may vary from one packet to the next and, over a given number of packets, a spread in the timing delay, $\Delta\tau$, can be determined. Over a sufficient number of packets, the spread $\Delta\tau$ can be measured such that a maximum timing delay of $\tau_{min+}\Delta\tau$ may be determined.

Therefore, in order to broadcast packets from an RRH, such as RRH 210, to mobile 219, and ensure continuity between the packets transiting the network, a timing delay can illustratively be introduced into the RRH broadcast such that each successive packet is guaranteed to be present at the RRH and ready for broadcast at its appointed time. Specifically, if the RRH broadcast delay is established at a time greater than $\tau_{min+}\Delta\tau$, with, illustratively, an additional timing tolerance delay added to $\tau_{min}$ to manage additional timing jitter, then each packet will be at the RRH when it is scheduled for broadcast.

The timing delay and spread can be determined by either a hardware or a software solution, or a combination of both. In an exemplary hardware solution, the timing delay can be calculated through knowledge of the topology of the network and the delay properties of the routing equipment and cables. By setting higher priority to CDMA packets, and knowing maximum allowable packet length (for example, 1500 bytes), one can predict the maximum delay spread $\Delta\tau$. Alternatively, timing delays and spread can be directly measured using a variety of software methods, such as methods involving an exchange of time stamps between endpoints and using statistical techniques to determine the time delay and spread. One illustrative example of such a software method is the well known Network Time Protocol (NTP). One skilled in the art will recognize that many such hardware and software methods may be used to determine the timing delay and spread.

As previously mentioned, in addition to timing synchronization, frequency synchronization across the network is also important. For example, in the embodiment of the invention involving hard handoff when entering or leaving a building a user detects the PN offset of a signal, e.g., a signal on the pilot channel. For this PN offset to be correctly detected the PN offset cycle of the RRH feeding for example antenna 43 should be in synchronization with that of the external base station and with the BTS. If such synchronization is not maintained, then the PN offset will not be appropriately identified. In other embodiments of the invention frequency synchronization is also important. If the RRHs are simulcasting the same signal from a single sector and the RRHs are radiating at slightly different frequencies (much more than 50 ppb), the signals from multiple RRHs will interfere with each other and cause degraded service. Additionally, if two adjacent RRHs are radiating signals from two different sectors, and they are radiating at slightly different frequencies (much greater than 50 ppb), the mobile will have difficulty establishing soft handoff with the two sectors, again resulting in degraded service. Frequency synchronization is achieved in accordance with the principles of the present invention by either a hardware solution or a software solution. An illustrative hardware solution to frequency synchronization is achieved by using the physical layer in Gigabit Ethernet networks to synchronize the CDMA signals. In order to achieve this synchronization, a frequency oscillator is illustratively used in each RRH as a frequency reference for all the frequency synthesizers in the RRH. These frequency oscillators are locked, using well known clock and data recovery methods, to the clock rate of the data coming in on the Ethernet connection. This clock rate, in turn, is set by the clock which BSI 203 uses to encode the Ethernet signals. The BSI 203 can use, for example, a stable and accurate stand-alone reference oscillator to generate all its clocks or, alternatively, may derive its reference from the base station clock. One skilled in the art will recognize that such a hardware implementation of frequency synchronization will require forwarding a frequency reference from each network node, thus requiring additional overhead to maintain synchronization in this manner. In addition, one skilled in the art will recognize that similar synchronization techniques may be used in other network transport methods.

On the other hand, if a software solution to frequency synchronization is used, a timestamp is illustratively applied by the BSI 203 to each downlink CDMA packet marking the time it is transmitted from BSI 203. At the RRH 210, the arrival time of each CDMA packet is recorded using a local clock and the difference between the embedded time stamp and the measured arrival time is calculated as the delay D. If the illustrative clocks at the BSI and RRH are synchronized, then D should be held constant. Thus the local RRH clock can be adjusted to the remote BSI 203 clock using well-known statistical methods. For example, a number of timestamp-minus-local-clock measurements corresponding to multiple packets can be used to calculate the frequency deviation over time. Over a desired period of time, the frequency error can be inferred from the total delay change that is detected. A frequency correction corresponding to this frequency error is used to compensate for the frequency deviation. In this way, the software controls the RRH 210 local clock by tracking and correcting the frequency in relation to the BSI 203 clock. Furthermore, to reduce the packet arrival jitter, and thus the accuracy of the frequency tracking mechanism, only specific packets can be used for frequency tracking. More particularly, in this example, the delay is recorded over a selected number of packets and is used for software synchronization.

Figure 6:
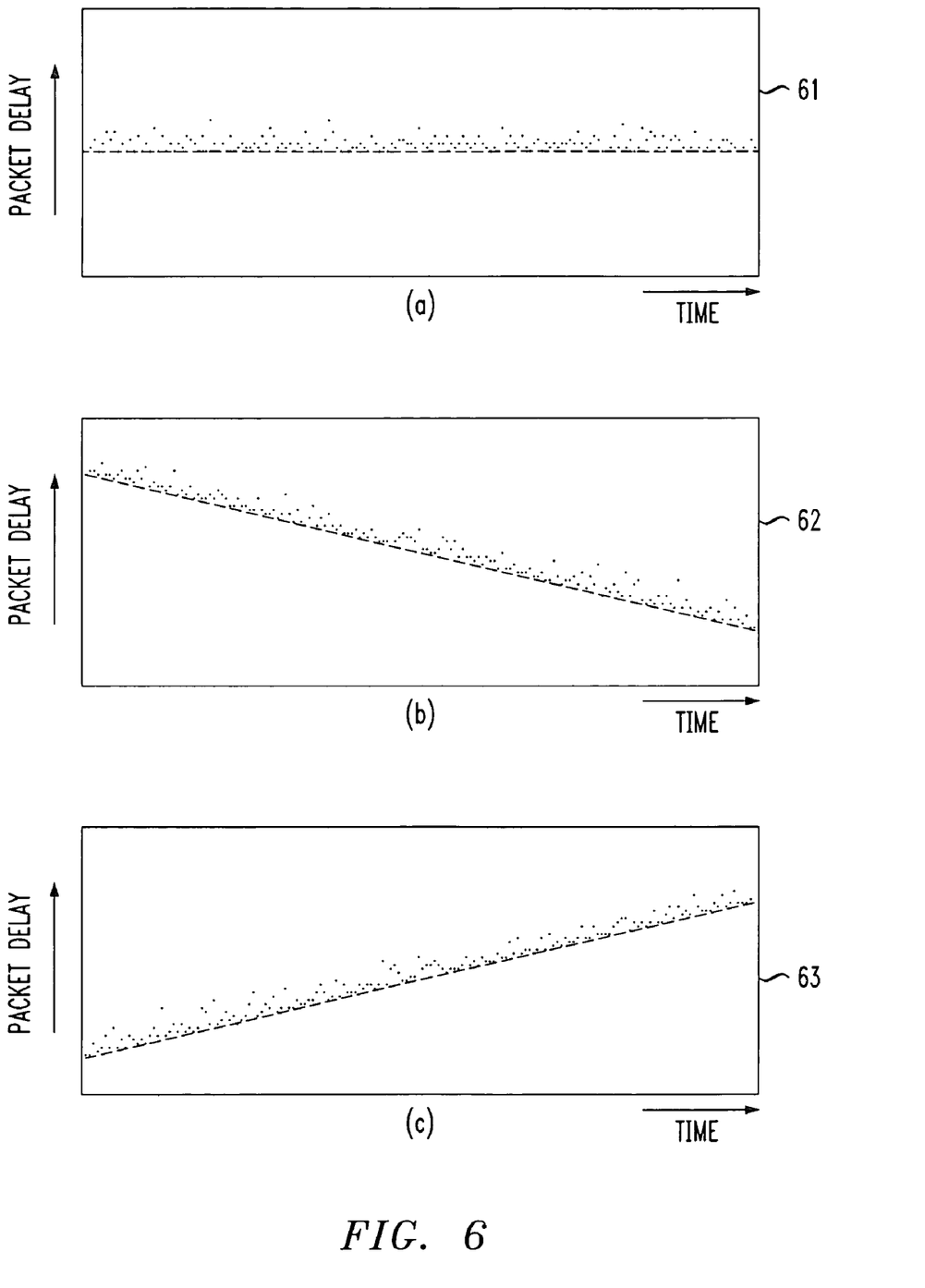
FIG. 6 is a graphical representation of data involved with synchronization.

This software solution is adaptable in a particularly advantageous manner for the hard handoff embodiment. As previously discussed, it is possible for the BSI, 203, to mark each packet with the time it is transmitted. The arrival time of each such packet is recorded using the local clock of the RRH and the time difference between the embedded time stamp and the arrival time thus determined. Accordingly as shown in FIG. 6, by graphing such time difference versus time of packet arrival at the RRH graphs such as shown at 61, 62, and 63 are possible. Due to variable delay times introduced by the transmission equipment, the graph will have some scatter. However, an average trend such as a least square fit for the data is obtainable. If a graph such as indicated at 61 is obtained the least square fit indicates a constant time of traversal from the BSI to the RRH. That is, the previously discussed minimum delay time, D, is remaining constant. Such lack of change indicates that the frequency clocks of the BSI and RRH are synchronized. The minimum time neither increases nor decreases since the clocks are not running at different frequencies. Similarly in the case of the graph shown at 63, the minimum time shows an increase with time and thus indicates that the frequency clock of the RRH is running faster than that of the BSI. For analogous reasons, the graph shown at 62 indicates the frequency clock of the RRH is running slower than that of the BSI.

In situations 62 and 63, correction of the RRH clock relative to the BSI clock is required to ensure a stabilized PN offset. Although the manner of achieving this correction is achievable using different approaches in one advantageous expedient a sampling of time differences is made over an ensemble of packets. Typically the number of packets checked should be in the range 100 to 1000 preferably 250 to 500. The observed minimal delay is set as a target value. The time differences are then further sampled over from 100 to 1000 preferably 250 to 500 packets and this minimum delay compared to the target. The frequency of the RRH local clock is then adjusted upwardly if the second minimal delay is higher or downwardly if the second minimal delay is lower. The process of measuring and adjusting continues until the fluctuation of the target compared to the next sample is approximately the same, i.e., less than 8 nanoseconds. The clock so adjusted is maintained at such value until the sampled average time difference exceeds 8 nanoseconds in which case adjustment begins again.

By selectively using an ensemble of packets with a measured delay, such as the smallest delay, the effect of switch jitters due to background traffic may be significantly reduced. Uplink signals are transmitted in a similar fashion as described above in association with downlink signals. When an uplink signal is received by an RRH, such as RRH 211, from, for example, illustrative mobile terminal 219, that RRH will convert the signal to a digital format and will buffer the digital signals and packetize them at a predetermined time interval or until a predetermined buffer fill level is reached. The RRH 211 will then send the packets of digital signals to the corresponding RDA 210 to which it is attached. As discussed above, each RDA 210 can have a plurality of ports associated with a plurality of addressable sectors. And, as also discussed above, multiple RDAs can be cascaded to in a way such that numerous RDA ports can be addressed to even more numerous remote radio heads. However, the CMU 204 typically can only accept a smaller, limited number of signal channels (e.g., 6 channels). This is not an issue on the downlink as the RDAs simply replicate the downlink packets and retransmit identical packets to multiple addresses. However, on the uplink, the packets flowing into the RDAs to the BSI 203 and CMU 204 are not identical—they are potentially each from different mobile users. Thus, a problem arises as to how to reduce the potential relatively large number of unique uplink packet data streams into the limited number of channels acceptable to the CMU 204.

This problem is overcome by the principles of the present invention. Specifically, referring to FIG. 3, in order for a large number of RDAs to communicate with the CMU in BSI 203, an illustrative processor at each RDA in a cascaded structure of RDAs, such as RDA 210, strips the headers off the packets corresponding to a unique sector, sums the data in those packets, and repacketizes the data before forwarding it to another RDA or the BSI 203. One skilled in the art will recognize that this processor may not be located within the RDA and that it may also be located in an independent unit attached to the RDA. Alternatively, the functionality of this processor may be located within one or more of the RRHs. In the case of cascaded RDAs each having such a processor, each RDA in the cascade will accomplish this summing function until the packets flowing to from a particular RDA 210 to the BSI 203 on the uplink correspond only to one of the channels of the CMU. While summing the data in packets traditionally would result in irreparably destroying the packets (i.e., because reconstruction of the original packets would be impossible), the data in the packets of the present invention correspond to coded baseband signals of all the traffic on a particular sector. Thus, using traditional processing well known in the art, the CMU can process and identify signals in the summed packets corresponding to a uniquely CDMA coded mobile user. These unique signals are then forwarded to end destinations within the cellular network.

Figure 3:
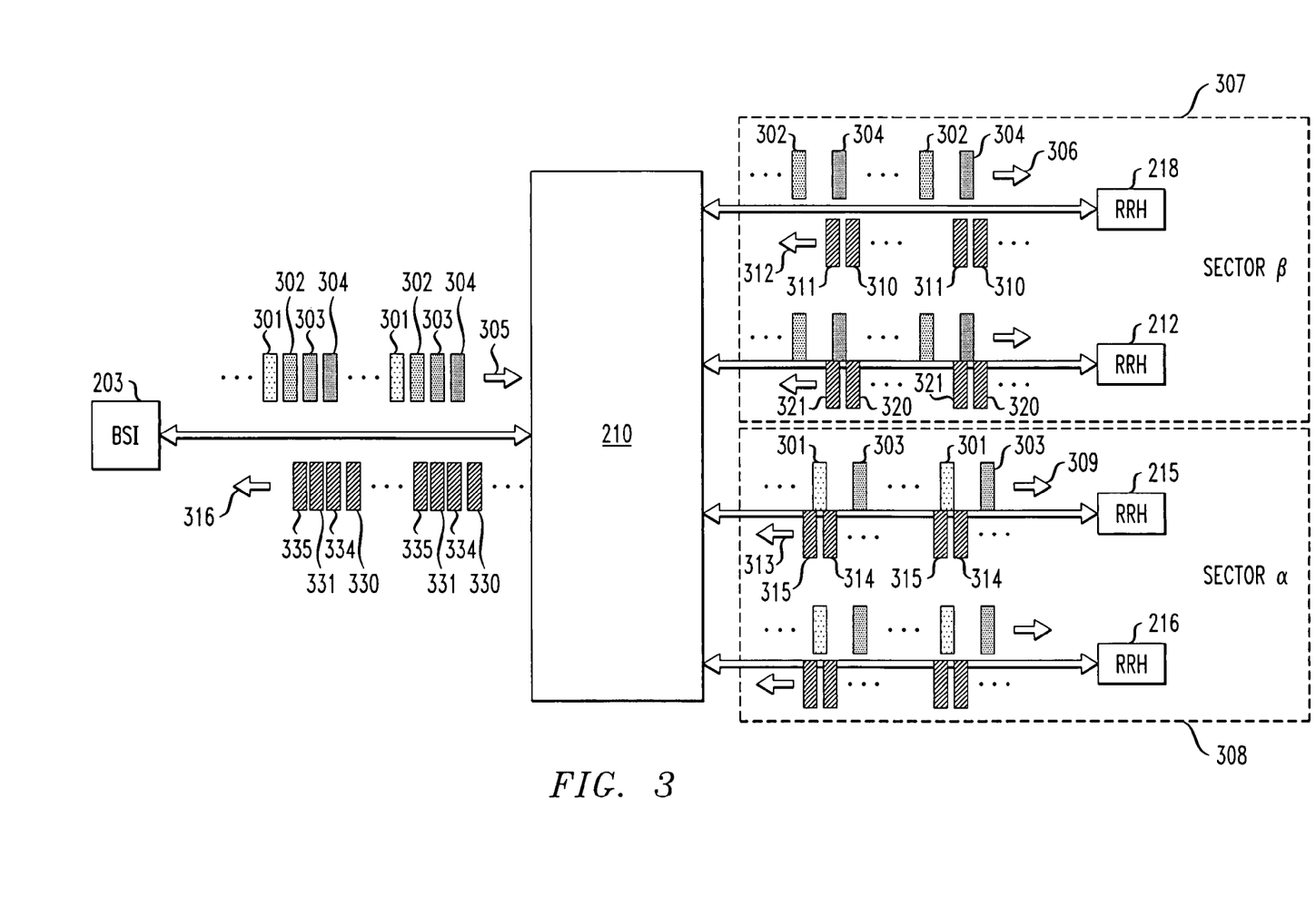
FIG. 3 shows how uplink signals in the network of FIG. 2 are aggregated.

More particularly, FIG. 3 shows an in-building network having two illustrative sectors, 307 and 308, each comprising two RRHs, each of which supports two traffic carriers (frequencies). As described above, on the downlink data packets 301-304 are transmitted by BSI 203 in direction 305 to RDA 210. The RDA then uses the addresses on each of those packets to determine to which sector (and in turn to which RRHs) a packet is routed. As shown in FIG. 3, packets 302 and 304 are, illustratively, encode information for traffic carriers in sector 307. Accordingly, RDA 210 replicates packets 302 and 304 and multicasts those packets in direction 306 to both RRH 212 and RRH 218 for radiation. Similarly, packets 301 and 303 are multicast in direction 309 to RRH 215 and RRH 216 which in turn will radiate these traffic carriers in sector 308.

On the uplink, however, and also as briefly discussed above, the RDA 210 acts as a summing node and aggregates the uplink data packets. Specifically, when RRHs support several mobile carriers (frequencies), those RRHs will each buffer the packets and forward them to RDA 210. Thus, for example, RRH 218 will send out packets 310 and 311 in direction 312 to RDA 210, RRH 212 will send out packets 320 and 321 in direction 322 to RDA 210, RRH 215 will illustratively send packets 314 and 315 in direction 313 to RDA 210, and RRH 216 will illustratively send out packets 324 and 325 in direction 323 to RDA 210. When those packets arrive at the RDA, the headers of the packets are removed and the data in any packets in the same sector are summed together. The RDA 210 then interleaves all unique baseband signals together and forwards out a single data stream containing packets of baseband signals from all sectors of the RDA 210. For example, packets 310 and 320 are summed to produce packet 330 and packets 311 and 321 are summed to produce packet 331. In a cascade of RDAs, this process is repeated at each RDA so that only a desired number of data streams containing packets of baseband symbols arrive at the BSI 203 in FIG. 2 and the CMU 204 in FIG. 2 in the base station. One skilled in the art will recognize that such a summing function is illustrative and may not be necessary depending upon the particular implementation of the network described herein. Additionally, if such a summing function is used, one skilled in the art will realize that this function can be performed at network nodes other than the RDA, such as at an RRH.

One skilled in the art will recognize that the above network structure facilitates flexible bandwidth management. For example, a network controller may be used (e.g., incorporated into the BSI) to dynamically assign ports on each RDA to a sector within the building. Thus, depending on the desired coverage and network usage, individual ports could each be assigned to individual sectors or, alternatively, any number of ports of the RDA could be assigned to an individual sector. Thus, in accordance with the principles of the present invention, wireless cellular network coverage can be extended by adapting an existing base station to broadcast coded cellular baseband signals over gigabit Ethernet networks using existing cabling within buildings. In fact, recently gigabit-over-Ethernet has been implemented over a wide variety of types of cabling, such as fiber, coaxial cable, as well as low cost category 5, category 6, and category 7 networking cables. Thus, the expense of installing additional cabling may be avoided. Additionally, relatively inexpensive switches (RDAs) and low powered radio equipment at the RRHs are used to broadcast the baseband signals to designated recipients.

One skilled in the art will also recognize that, since standard networking protocols may be used according to the principles of the present invention, the network of the present invention could be used to transmit and receive various other wireless network protocols in a similar fashion. For example, by adding 802.11 (WiFi) access points to the remote radio heads, the network of the present invention could be used in a similar fashion as described above to distribute 802.11 protocol signals to desired destinations. Additionally, since Ethernet can also provide power to network devices (i.e., via the Power-over-Ethernet 802.3af standard), the cost of installing the aforementioned radios and other equipment can be further reduced by supplying power to such components without an independent power source connection. One skilled in the art will also recognize that the network of the present invention could be used in place of a DAS in a "hoteling" arrangement associated with one or more remote antennas in an outdoor environment, such as that used in the aforementioned dense urban areas to provide increased coverage in such environments. Finally although transitions to a smaller wireless cell is consistently referred to as a transition involving a building, other transitions to small cells such as hierarchical cells are also contemplated by the term building.

The foregoing merely illustrates the principles of the invention. It will thus be appreciated that those skilled in the art will be able to devise various arrangements that, although not explicitly described or shown herein, embody the principles of the invention and are within its spirit and scope. Furthermore, all examples and conditional language recited herein are intended expressly only to be for pedagogical purposes to aid the reader in understanding the principles of the invention and are to be construed as being without limitation to such specifically recited examples and conditions.

What is claimed is:

1. A wireless network capable of supporting communications both internal to and external to a building comprising:
   1) a first base station with an associated first antenna that combined are adapted for transmission of a first primary signal and a first pilot signal at a first carrier frequency with a first P/N offset, said transmission emanating external to said building,
   2) a second base station with an associated second antenna that combined are adapted for transmission of a second primary signal with a second P/N offset and at a second carrier frequency, said transmission emanating internal to said building,
   3) a third base station with an associated antenna that combined are adapted for transmission of a second pilot signal emanating internal to said building at said first carrier frequency, with said second P/N offset and at an intensity that avoids unacceptable interference with said first primary signal, and
   4) a fourth base station with an associated antenna adapted for transmission of a third pilot signal emanating external to said building at said second carrier frequency with said first P/N offset wherein
      A) said first carrier frequency and said second carrier frequency are different and
      B) said first P/N offset and said second P/N offset are different;
   and further wherein said first carrier frequency of said first primary signal and said second pilot signal undergo synchronization wherein said first primary signal first carrier frequency is set in a wireless network and said second pilot signal first carrier frequency is set in a data network;
   and still further wherein said synchronization is accomplished by applying a first indication of a time to at least a first data packet associated with said first carrier frequency of said primary signal in a plurality of coded cellular signals, recording at a first node in said data network the arrival time of said at least a first data packet, determining a difference between said first indication and said arrival time of said at least a first data packet and maintaining said difference between said first indication and said arrival time by altering a clock associated with said first node in said data network.

2. The network of claim 1 wherein at least two of said second, third, and fourth base station are the same base station.

3. The network of claim 1 wherein said second base station comprises a base station interface card.

4. The network of claim 1 wherein said antenna associated with said third base station is located within 100 feet of an exit of said building.

5. A method for communication including the continuing of said communication when a user of a primary network communication channel at a one carrier frequency moves between outside a building and inside a building and continues communicating on another carrier frequency, said method comprises
   1) transmitting from an antenna external to said building a first pilot signal at a second P/N offset with a second carrier frequency and at an intensity that avoids unacceptable interference with said primary communication channel,
   2) transmitting from an antenna internal to said building a second pilot signal at a first carrier frequency with a first P/N offset, and at an intensity that avoids unacceptable interference with said primary channel communication wherein
      A) said first and second carrier frequency are different, and
      B) said first P/N offset and said second P/N offset are different;
   and further wherein said carrier frequency of said primary network communication channel and said second pilot signal first carrier frequency undergo synchronization wherein said primary network communication channel carrier frequency is set in a wireless network and said second pilot signal first carrier frequency is set in a data network;
   and still further wherein said synchronization is accomplished by applying a first indication of a time to at least a first data packet associated with said carrier frequency of said primary communication channel in a plurality of coded cellular signals, recording at a first node in said data network the arrival time of said at least a first data packet, determining a difference between said first indication and said arrival time of said at least a first data packet and maintaining said difference between said first indication and said arrival time by altering a clock associated with said first node in said data network.

6. The method of claim 5 wherein said antenna internal to said building is located within 100 feet of an entrance to said building.

7. The method of claim 5 wherein after said user enters said building detection of said second pilot signal results in said communication continuing on a primary channel propagating internal to said building at said second carrier frequency.

8. The method of claim 7 wherein said communication continuing occurs as a result of a hard handoff.

9. The method of claim 5 wherein said difference between said first indication of said arrival time is determined for a first plurality of said data packets and altering of said clock associated with said first indication is performed such that the minimum of said differences for a second plurality of packets having said arrival time subsequent to said first plurality is approximately the same as the minimum of said differences of said first plurality.

* * * * *